United States Patent
Katou

(10) Patent No.: US 8,444,529 B2
(45) Date of Patent: May 21, 2013

(54) HYDRAULIC PRESSURE CONTROL APPARATUS FOR VEHICLE WITH AUTOMATIC TRANSMISSION

(75) Inventor: Yoshiaki Katou, Fujisawa (JP)

(73) Assignee: Jatco Ltd, Fuji-shi (JP)

( * ) Notice: Subject to any disclaimer, the term of this patent is extended or adjusted under 35 U.S.C. 154(b) by 230 days.

(21) Appl. No.: 13/086,947

(22) Filed: Apr. 14, 2011

(65) Prior Publication Data

US 2011/0263381 A1 Oct. 27, 2011

(30) Foreign Application Priority Data

Apr. 26, 2010 (JP) ................. 2010-100890

(51) Int. Cl.
*B60W 10/04* (2006.01)
*B60W 10/10* (2006.01)
(52) U.S. Cl.
USPC .......................................... 477/115
(58) Field of Classification Search
USPC .......................... 477/115, 117, 156, 158, 162
See application file for complete search history.

(56) References Cited

U.S. PATENT DOCUMENTS

| | | | | |
|---|---|---|---|---|
| 4,278,403 A * | 7/1981 | Shafer | ............................... | 417/38 |
| 8,056,666 B2 * | 11/2011 | Portell et al. | ................... | 180/165 |
| 2002/0166532 A1 * | 11/2002 | Mori et al. | ................ | 123/179.31 |
| 2008/0060862 A1 | 3/2008 | Schiele et al. | | |
| 2010/0311538 A1 * | 12/2010 | Miyabe et al. | .................... | 477/2 |

* cited by examiner

*Primary Examiner* — Justin Holmes
(74) *Attorney, Agent, or Firm* — Foley & Lardner LLP

(57) ABSTRACT

A hydraulic control apparatus including a cut valve disposed in a hydraulic circuit, a hydraulic storage device connected to the hydraulic circuit through the cut valve, a stroke amount detecting means for detecting an amount of a piston stroke in the hydraulic storage device, and a control means for discharging a hydraulic pressure from the hydraulic storage device to the hydraulic circuit upon restarting an engine from the idling stop, wherein the control means is configured to open the cut valve upon restarting the engine and, after opening the cut valve, close the cut valve in a case where a change in the detected amount of a stroke of the piston is reversed from such a direction as to discharge the hydraulic pressure from the hydraulic storage device to such a direction as to supply the hydraulic pressure to the hydraulic storage device.

9 Claims, 8 Drawing Sheets

HYDRAULIC PRESSURE CONTROL APPARATUS FOR VEHICLE WITH AUTOMATIC TRANSMISSION

BACKGROUND OF THE INVENTION

The present invention relates to a hydraulic pressure control apparatus for an automatic transmission-equipped vehicle which carries out idling stop.

An automatic transmission includes a plurality of frictional engagement devices such as a clutch and a brake (hereinafter referred to merely as a clutch) in a gear train. The respective frictional engagement devices include friction plates and are operated to come into engagement and release by hydraulic pressure which is applied to the friction plates. The automatic transmission realizes a plurality of speeds (or gear stages) by combination of the engagement and release of the frictional engagement devices. For instance, the automatic transmission includes a low clutch (LOW/C) and a high clutch (HIGH/C), and establishes forward first speed by engagement of the low clutch and third speed by combination of release of the low clutch and engagement of the high clutch.

The respective clutches include a hydraulic pressure chamber and a piston which is movable by a hydraulic pressure which is supplied to the hydraulic pressure chamber. An operating process of the respective clutches includes a stroke reducing process during which the piston runs to abut against the friction plates in an idle stroke of the piston, and an engagement control process during which the hydraulic pressure to be supplied to the hydraulic pressure chamber varies and is controlled to reach a maximum engagement hydraulic pressure in order to allow the piston to actually abut against the friction plates and smoothly shift an engagement state of the friction plates from the slippage state to the full-engagement state.

There has been conventionally proposed a vehicle equipped with such an automatic transmission as described above, which has an idling stop function in order to enhance fuel economy and reduce emission of exhaust gas. That is, in a case where the vehicle is temporarily stopped for waiting at a traffic light at an intersection during travelling of the vehicle or for waiting for passage of a train at a railroad crossing, the engine is allowed to automatically stop, and after that, at a time in which a predetermined condition is satisfied, the engine is restarted to run the vehicle.

Meanwhile, in the automatic transmission, the above-described clutch is brought into an engagement state and a release state by using the hydraulic pressure to be supplied by a mechanically operated oil pump which is driven by engine power. However, an operation of the oil pump is also stopped during an idling stop of the engine, and therefore, a necessary hydraulic pressure cannot be obtained immediately after the engine is restarted.

Accordingly, upon restarting the engine after the idling stop, the stroke reducing process cannot be quickly accomplished to thereby fail to obtain a desired response ability.

In order to solve the above problem, it is considered that supply of the hydraulic pressure is continued using an auxiliary electric oil pump even during the idling stop. However, in such a case, an increase in cost will be caused.

United State Patent Application Publication No. US2008/0060862 A1 discloses a hydraulic pressure control apparatus in which an accumulator having a spring-biased piston inside thereof is connected to a hydraulic circuit via a cut valve to thereby keep the accumulator in a hydraulic storage state. Upon restarting the engine, the cut valve is opened to rapidly discharge the hydraulic pressure pressurized by the spring from the accumulator, so that a lack of the hydraulic pressure supplied by the oil pump is compensated.

SUMMARY OF THE INVENTION

In the hydraulic pressure control apparatus of the above-described conventional art, the discharge of the hydraulic pressure from the accumulator is carried out for compensating the lack of the hydraulic pressure supplied by the oil pump, and during a time period in which the hydraulic pressure in the accumulator is higher than a discharge pressure of the oil pump, the hydraulic pressure is supplied from the accumulator to the hydraulic circuit. However, when the hydraulic pressure in the accumulator becomes lower than the discharge pressure of the oil pump due to discharge of the hydraulic pressure from the accumulator, the oil pump is operated to supply the hydraulic pressure not only to carry out engagement of the clutch but also to compress the piston of the accumulator against the spring force. As a result, it is difficult to obtain a high response ability and a smooth startability of the hydraulic pressure control apparatus.

It is considered that the hydraulic pressure control apparatus of the above-described conventional art merely allows the accumulator to be kept in the hydraulic storage state due to a predetermined amount of elastic deformation of the elastic member biasing the piston, but fails to monitor variation in the hydraulic storage state of the accumulator with time.

The present invention has been made in view of the above problems in the conventional art. It is an object of the present invention to provide a hydraulic control apparatus for an automatic transmission which is capable of grasping a hydraulic storage state of a hydraulic storage device such as an accumulator and enhancing a response ability to shifting from idling stop to restart of the engine.

In a first aspect of the present invention, there is provided a hydraulic control apparatus for a vehicle equipped with an automatic transmission, the vehicle having a function of idling stop of an engine, the automatic transmission including a hydraulic circuit connected to an oil pump which is driven by the engine, the hydraulic control apparatus including:
  a cut valve disposed in the hydraulic circuit;
  a hydraulic storage device including a piston, the hydraulic storage device being connected to the hydraulic circuit through the cut valve;
  a stroke amount detecting means for detecting an amount of a stroke of the piston in the hydraulic storage device; and
  a control means for discharging a hydraulic pressure from the hydraulic storage device to the hydraulic circuit so as to compensate a lack of a hydraulic pressure from the oil pump upon restarting the engine from the idling stop,
  wherein the control means is configured to open the cut valve upon restarting the engine and, after opening the cut valve, close the cut valve in a case where a change in the detected amount of a stroke of the piston is reversed from such a direction as to discharge the hydraulic pressure from the hydraulic storage device to such a direction as to supply the hydraulic pressure to the hydraulic storage device.

In a second aspect of the present invention, there is provided the hydraulic control apparatus according to the first aspect of the present invention, wherein the control means is configured to subject the cut valve to duty-cycle control until the piston is located to a position corresponding to a maximum hydraulic storage state of the hydraulic storage device in a case where an engine speed becomes a predetermined value or more after the cut valve is closed.

In a third aspect of the present invention, there is provided the hydraulic control apparatus according to the first aspect of the present invention, wherein the control means is configured to prohibit the idling stop in a case where after the cut valve is opened, a rate of change in the amount of stroke of the piston is kept at 0 during a predetermined time period when the piston is in a position except for both ends of a stroke region of the piston.

The present invention has the following effects. During a time period in which a hydraulic pressure discharged by an oil pump continues to increase, a hydraulic pressure in an accumulator can be exclusively supplied to a hydraulic circuit so as to increase a hydraulic pressure in the hydraulic circuit. As a result, a piston stroke reducing process in a clutch can be allowed to quickly proceed to thereby obtain a high response ability upon shifting from idling stop to restart of the engine.

DETAILED DESCRIPTION OF THE INVENTION

Figure 1:
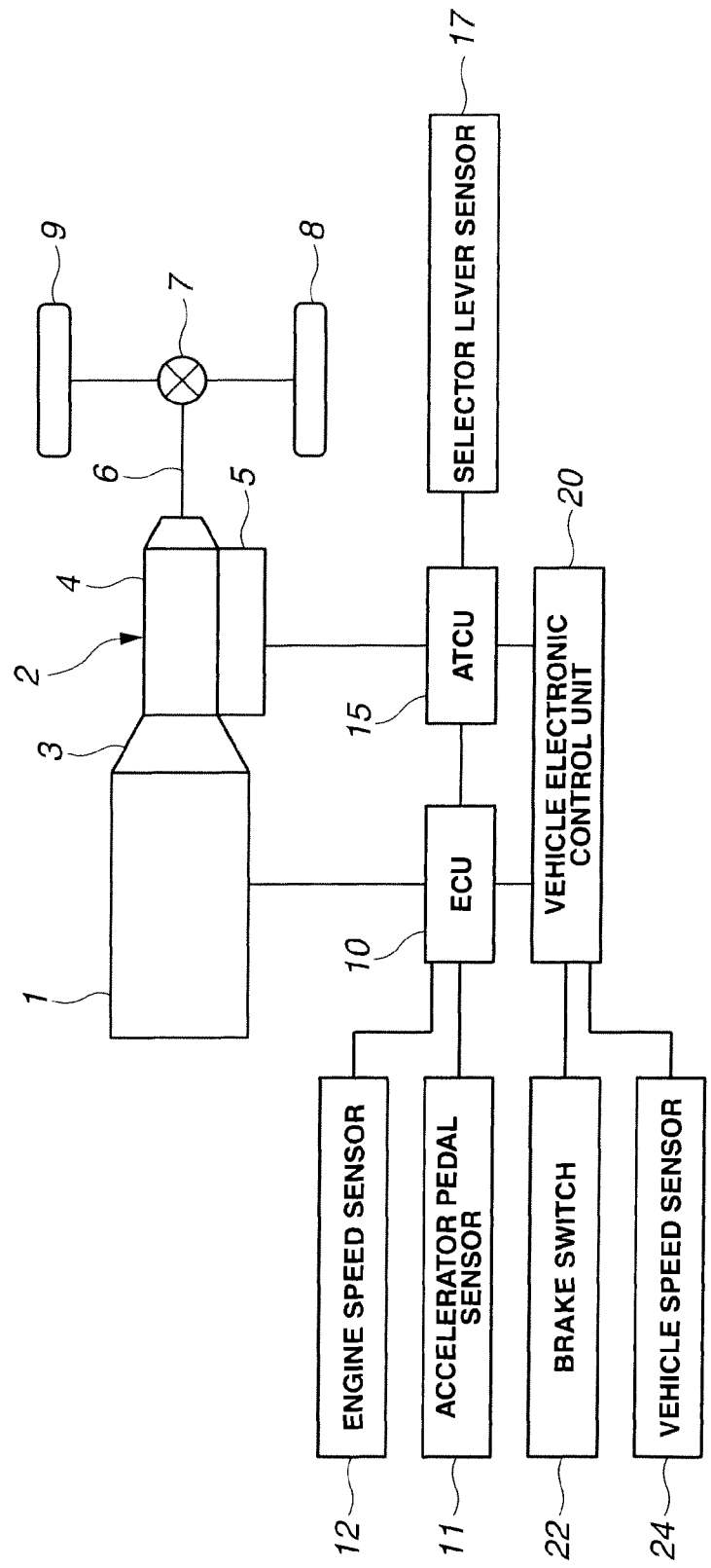
FIG. 1 is a block diagram showing a drive system of a vehicle to which a hydraulic control apparatus according to an embodiment of the present invention is applicable.

Referring to FIG. 1 to FIG. 6, a hydraulic control apparatus according to an embodiment of the present invention will be explained hereinafter. FIG. 1 is a block diagram showing a drive system of a vehicle to which the hydraulic control apparatus according to the embodiment of the present invention is applicable.

As shown in FIG. 1, automatic transmission 2 is connected to an output shaft of engine 1. Automatic transmission 2 includes torque convertor 3, transmission mechanism 4 and hydraulic control valve unit 5. An output from automatic transmission 2 is transmitted from drive shaft 6 to drive road wheels 8, 9 via differential gear 7.

Engine control unit (ECU) 10 which controls a throttle valve (not shown), a fuel injection valve (not shown) and an ignition timing, etc., is connected to engine 1. Automatic transmission control unit (ATCU) 15 which controls a hydraulic pressure to be supplied to a clutch, etc., to realize a target speed (or target gear stage) is connected to automatic transmission 2.

Vehicle electronic control unit 20 is connected to ECU 10 and ATCU 15.

Inputted to ECU 10 are a signal indicative of an accelerator opening degree which is outputted from accelerator pedal sensor 11, and a signal indicative of an engine speed (i.e., a rotation speed of an output shaft of engine 1) which is outputted from engine speed sensor 12.

Figure 3:
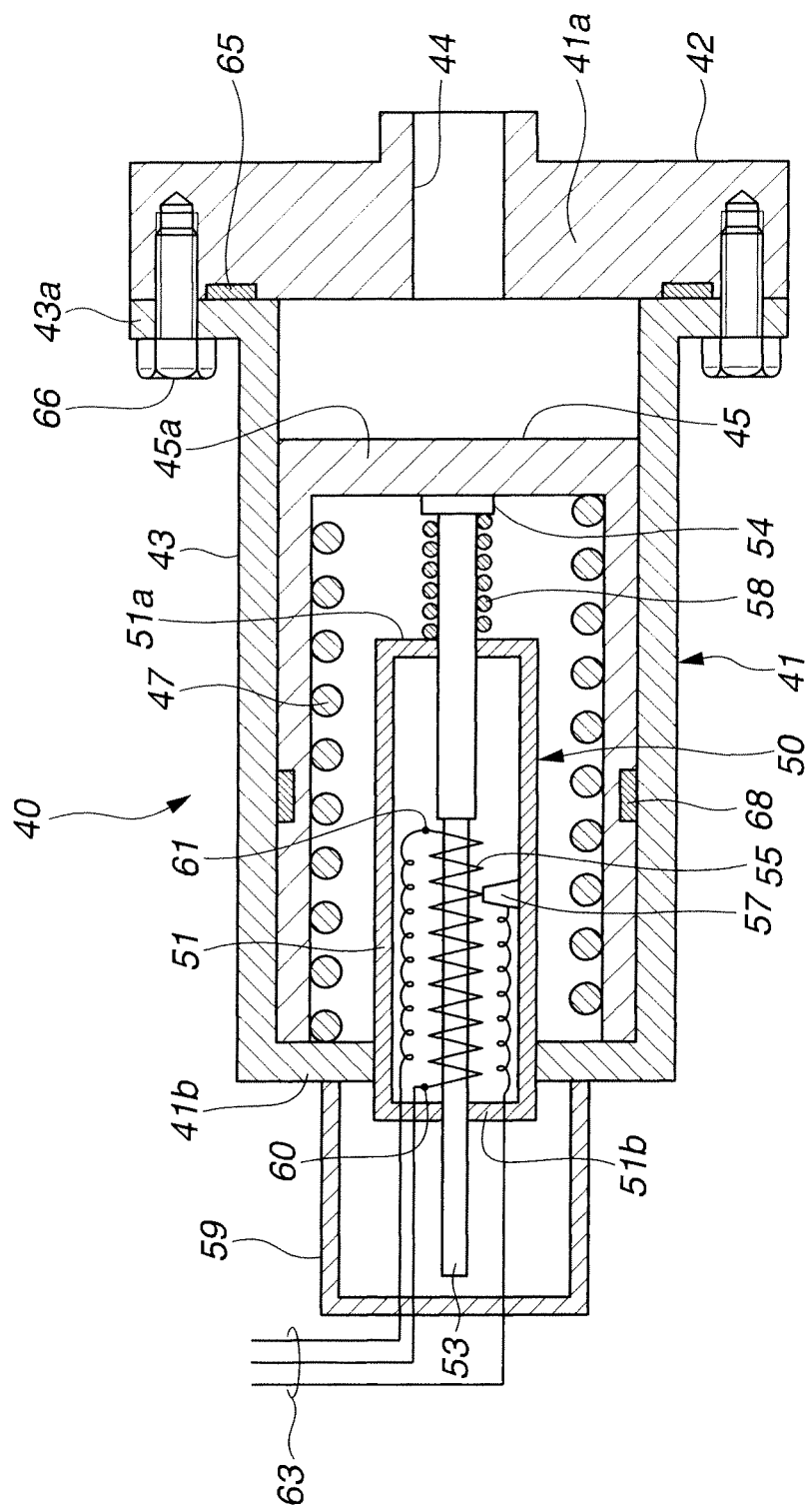
FIG. 3 is a diagram showing a construction of an accumulator in the hydraulic control apparatus according to the embodiment.

Inputted to ATCU 15 are a signal indicative of a position of a selector lever which is outputted from selector lever sensor 17, the signal indicative of an engine speed through ECU 10, and a signal indicative of an amount of piston stroke in accumulator 40 which is outputted from stroke sensor 50 as shown in FIG. 3. Stroke sensor 50 will be explained in detail later.

Inputted to vehicle electronic control unit 20 are signals outputted from brake switch 22 and vehicle speed sensor 24, respectively. Also inputted to vehicle electronic control unit 20 are the signal indicative of an accelerator opening degree through ECU 10, and the signal indicative of a position of the selector lever through ATCU 15. Vehicle electronic control unit 20 generates control commands to ECU 10 and ATCU 15, respectively, in order to integratedly or comprehensively control engine 1 and automatic transmission 2 in accordance with a vehicle operating condition which is determined on the basis of these signals.

Particularly, under idling stop control, vehicle electronic control unit 20 determines an automatic stop condition of engine 1 in a case where the vehicle is in a stop state (i.e., vehicle speed=0), the selector lever is in a neutral (N) position or a parking (P) position and the accelerator opening degree is zero (that is, the accelerator pedal is not in a depressed state), or in a case where the vehicle is in the stop state, the selector lever is in a drive (D) position and the accelerator opening degree is zero, and a brake is ON (that is, a brake pedal is in a depressed state).

A restart condition of engine 1 is determined in a case where the automatic stop condition as described above becomes unfulfilled.

Vehicle electronic control unit 20 outputs a command to stop engine 1 to ECU 10 in accordance with determination of fulfillment of the automatic stop condition of engine 1, and outputs a command to restart engine 1 to ECU 10 in accordance with determination of fulfillment of the restart condition of engine 1. In response to these commands, ECU 10 allows engine 1 to stop and restart.

Further, the command to stop engine 1 and the command to restart engine 1 are also outputted to ATCU 15. In response to the commands, ATCU 15 executes idling stop associating control of automatic transmission 2 as explained later.

Figure 2:
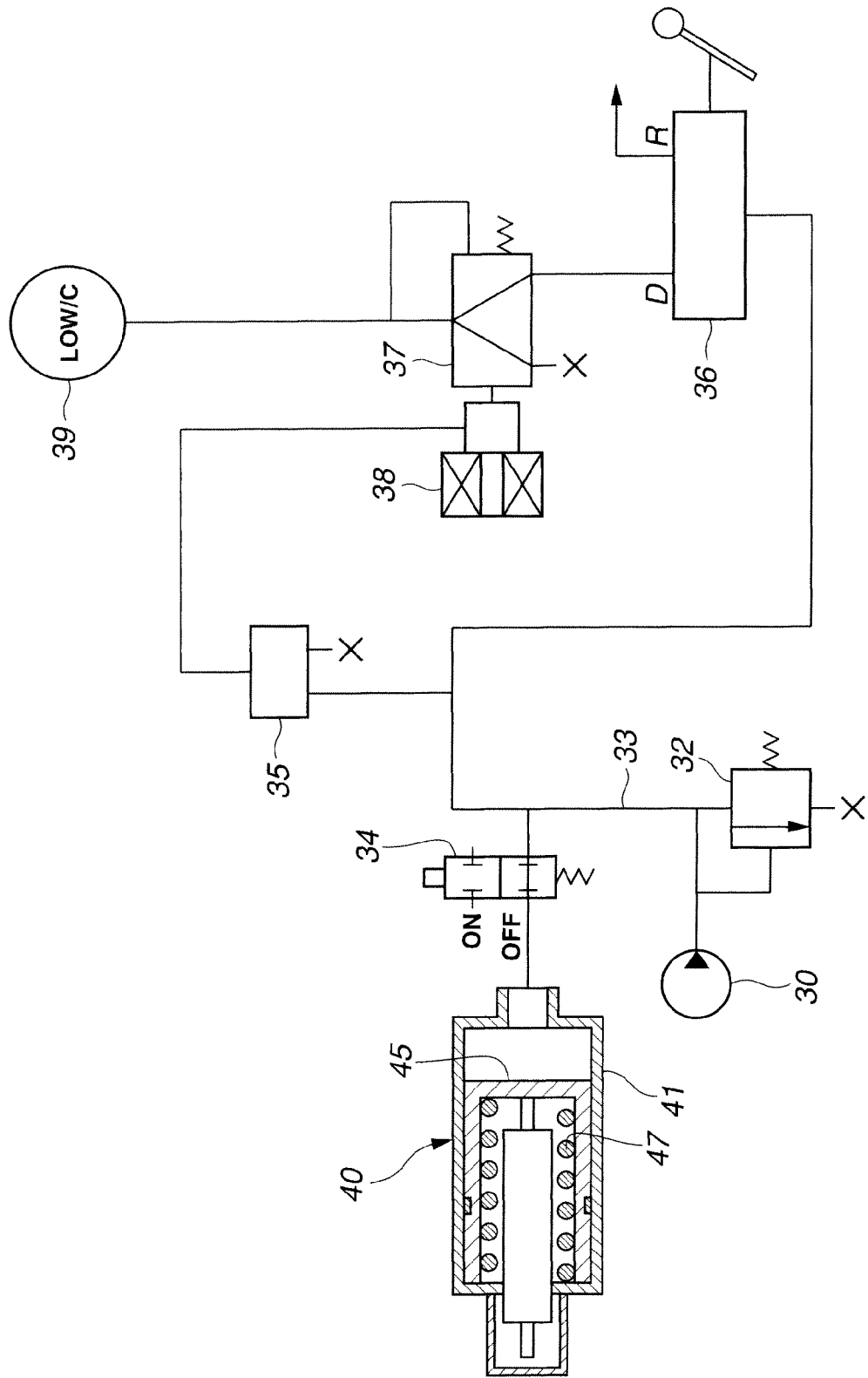
FIG. 2 is a diagram showing a hydraulic circuit relating to idling stop in which the hydraulic control apparatus according to the embodiment is incorporated.

FIG. 2 shows a hydraulic circuit relating to idling stop. As shown in FIG. 2, a hydraulic pressure outputted from oil pump 30 which is driven by rotation of the output shaft of engine 1 is inputted to regulator valve 32. Regulator valve 32 controls the inputted hydraulic pressure to a line pressure which is inputted to an inlet port of manual valve 36 through line pressure hydraulic passage 33.

D range port of manual valve 36 is connected to a hydraulic chamber of low clutch (LOW/C) 39 which is to be engaged at forward first speed, through control valve 37. The D range port is connected to a control valve (not shown) for the other clutches which are to be engaged at the other speeds.

Control valve 37 controls a pilot pressure which is generated from the line pressure by pilot valve 35, and produces a drive pressure using solenoid 38. Control valve 37 controls and outputs a hydraulic pressure (clutch pressure) to be supplied to low clutch 39 in accordance with a command from ATCU 15.

Accumulator 40 is connected to line pressure hydraulic passage 33 connected to the inlet port of manual valve 36 through electromagnetic cut valve 34. Electromagnetic cut valve 34 is switchable between an ON position and an OFF position and operated to establish fluid communication between accumulator 40 and line pressure hydraulic passage 33 in the OFF position and block the fluid communication therebetween in the ON position. Electromagnetic cut valve 34 is subjected to duty-cycle control.

During running of the vehicle in the D range, electromagnetic cut valve 34 is held in the OFF position in which accumulator 40 is communicated with line pressure hydraulic passage 33. In this condition, accumulator 40 is in a hydraulic storage state in which accumulator 40 is filled with working oil and stores a hydraulic pressure corresponding to the line pressure. The hydraulic pressure stored in accumulator 40 is hereinafter referred to as an accumulator pressure.

Accumulator 40 includes cylinder 41 and piston 45 accommodated in cylinder 41. Piston 45 is biased by return spring 47 in a direction against a hydraulic pressure which is supplied through electromagnetic cut valve 34.

FIG. 3 is a diagram showing a construction of accumulator 40. As shown in FIG. 3, cylinder 41 includes base plate 42 and tubular housing 43. Tubular housing 43 has flange portion 43a at one end thereof which extends in a radially outward direction of tubular housing 43. Tubular housing 43 is fixed to base plate 42 at flange portion 43a by means of bolts 66. Oil seal 65 is disposed between an end surface of flange portion 43a and an end surface of base plate 42 which are opposed to each other, and serves for hermetically sealing between flange portion 43a and base plate 42.

Base plate 42 is formed with oil hole 44 which is communicated with electromagnetic cut valve 34. Base plate 42 serves as base wall 41a of cylinder 41 which is located on the side of one end of cylinder 41. A bottom of tubular housing 43 serves as end wall 41b of cylinder 41 which is located on the side of the other end of cylinder 41.

Piston 45 has a hollow cylindrical shape and includes bottom wall 45a disposed on the side of base wall 41a of cylinder 41 and an open end disposed on an opposite side of bottom wall 45a. Seal ring 68 is disposed on an outer circumferential surface of piston 45.

Return spring 47 is accommodated inside piston 45 and disposed between bottom wall 45a of piston 45 and end wall 41b of cylinder 41.

End wall 41b of cylinder 41 is formed with a through-hole to which stroke sensor 50 is fixed. That is, a portion of stroke sensor 50 is exposed to an outside of cylinder 41. Stroke sensor 50 includes casing 51 and slide shaft 53 extending through casing 51. Slide shaft 53 has resistor member 55 on an outer circumferential surface thereof. Stroke sensor 50 further includes brush 57 which is disposed to be movable relative to resistor member 55 and slidable on resistor member 55. Thus, stroke sensor 50 serves as a potentiometer constituted of resistor member 55 and brush 57. Resistor member 55 extends in an axial direction of slide shaft 53. Brush 57 is fixed to an inner surface of casing 51.

Casing 51 has inside end wall 51a and outside end wall 51b which are located on opposite sides in an axial direction of casing 51, each being formed with a through-hole through which slide shaft 53 extends.

Slide shaft 53 has head 54 on one end thereof. Disposed between head 54 and inside end wall 51a of casing 51 is back spring 58 which biases slide shaft 53 in a direction toward bottom wall 45a of piston 45. With this construction, head 54 of slide shaft 53 is allowed to always abut against bottom wall 45a of piston 45, and therefore, slide shaft 53 is allowed to make unitary movement with piston 45.

FIG. 3 shows the condition in which the open end of piston 45 is allowed to seat on end wall 41b of cylinder 41 by return spring 47 compressed by a maximum amount with a maximum value of the accumulator pressure. In this condition, the other end of slide shaft 53 outwardly extends from casing 51 through the through-hole of outside end wall 51b. A length of slide shaft 53 is set such that the other end of slide shaft 53 is supported at a portion of outside end wall 51b which defines the through-hole of casing 51 even when the accumulator pressure is reduced to a minimum value to thereby allow piston 45 to abut against base wall 41a of cylinder 41.

End wall 41b of cylinder 41 is provided with dust-proof cover 59 which covers a portion of casing 51 which is exposed to an outside, and a portion of slide shaft 53 which is projected from outside end wall 51b of casing 51.

Further, the portion of casing 51 which is exposed to an inside of dust-proof cover 59 or end wall 41b of cylinder 41 is formed with small holes (not shown) etc. With provision of the small holes, an interior of piston 45 within cylinder 41 which is located on the side of return spring 47 is under atmospheric pressure.

Wirings 63 which extend from both ends of resistor member 55 and brush 57, respectively, are drawn out from outside end wall 51b of casing 51. A signal outputted from stroke sensor 50 is inputted to ATCU 15 through wirings 63.

Stroke sensor 50 has terminal 60 as a common terminal at one end of resistor member 55, and determines a value of a partial voltage between terminal 60 and brush 57 with respect to a voltage which is applied between terminal 60 and terminal 61 at the other end of resistor member 55. Stroke sensor 50 can detect a position of piston 45 by a ratio of the thus determined partial voltage value to a partial voltage value in a case where piston 45 is seated on end wall 41b of cylinder 41, and to a partial voltage value in a case where piston 45 is abutted against base wall 41a of cylinder 41.

Piston stroke range is determined to lie between the position of piston 45 in which piston 45 is seated on base wall 41a and the position of piston 45 in which piston 45 is seated on end wall 41b.

An amount of displacement (or stroke) of piston 45 of accumulator 40 (hereinafter referred to as an accumulator stroke amount) is determined such that the amount of displacement of piston 45 in a position at the time at which the accumulator pressure is a maximum value Pmax is set as a minimum value, and the amount of displacement of piston 45 from the position in a discharge direction (i.e., in a direction toward base wall 41a) is indicated as a positive value.

Figure 4:
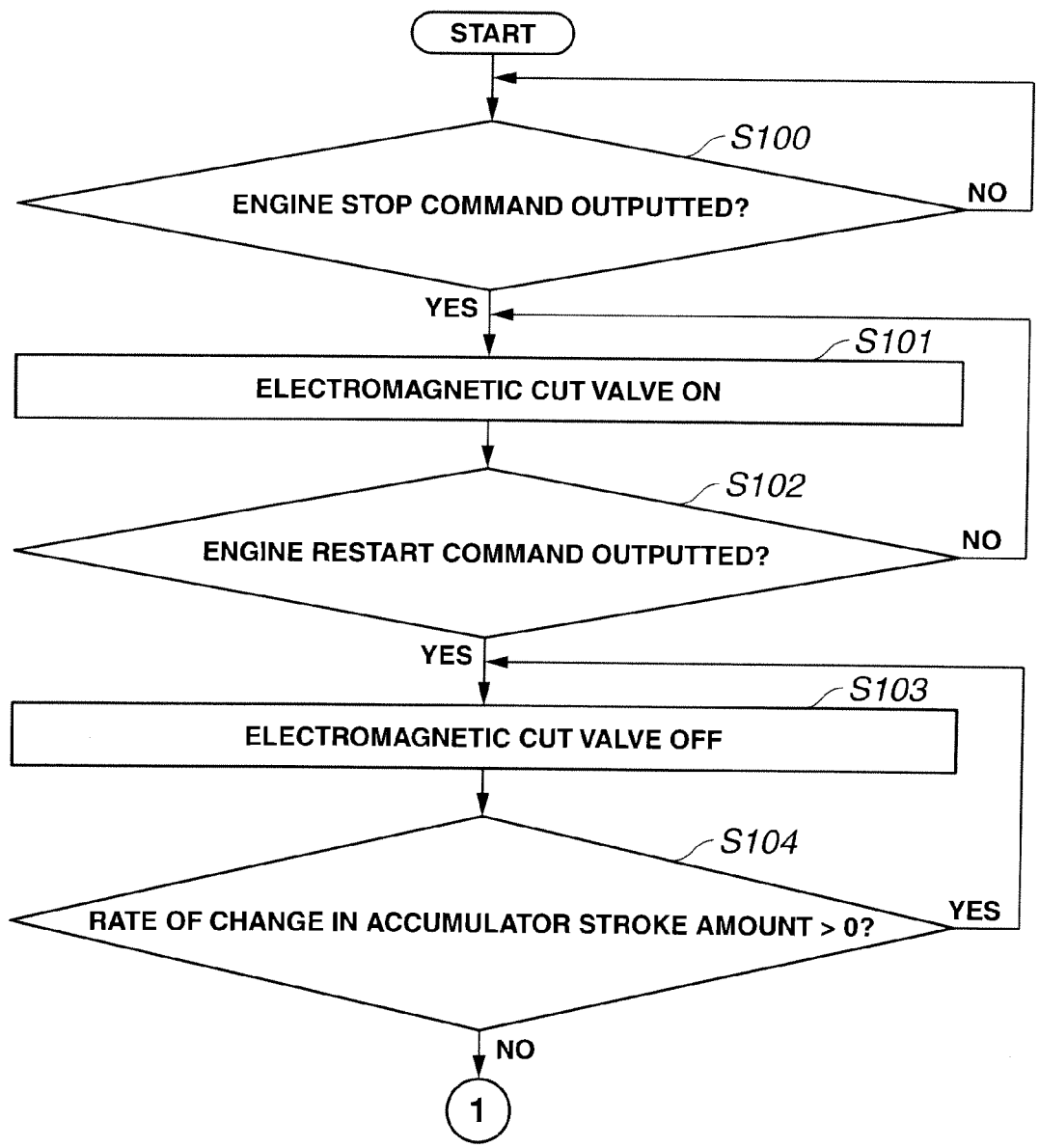
FIG. 4 is a flowchart showing a routine of idling stop associating control which is executed in the hydraulic control apparatus according to the embodiment.
Figure 5:
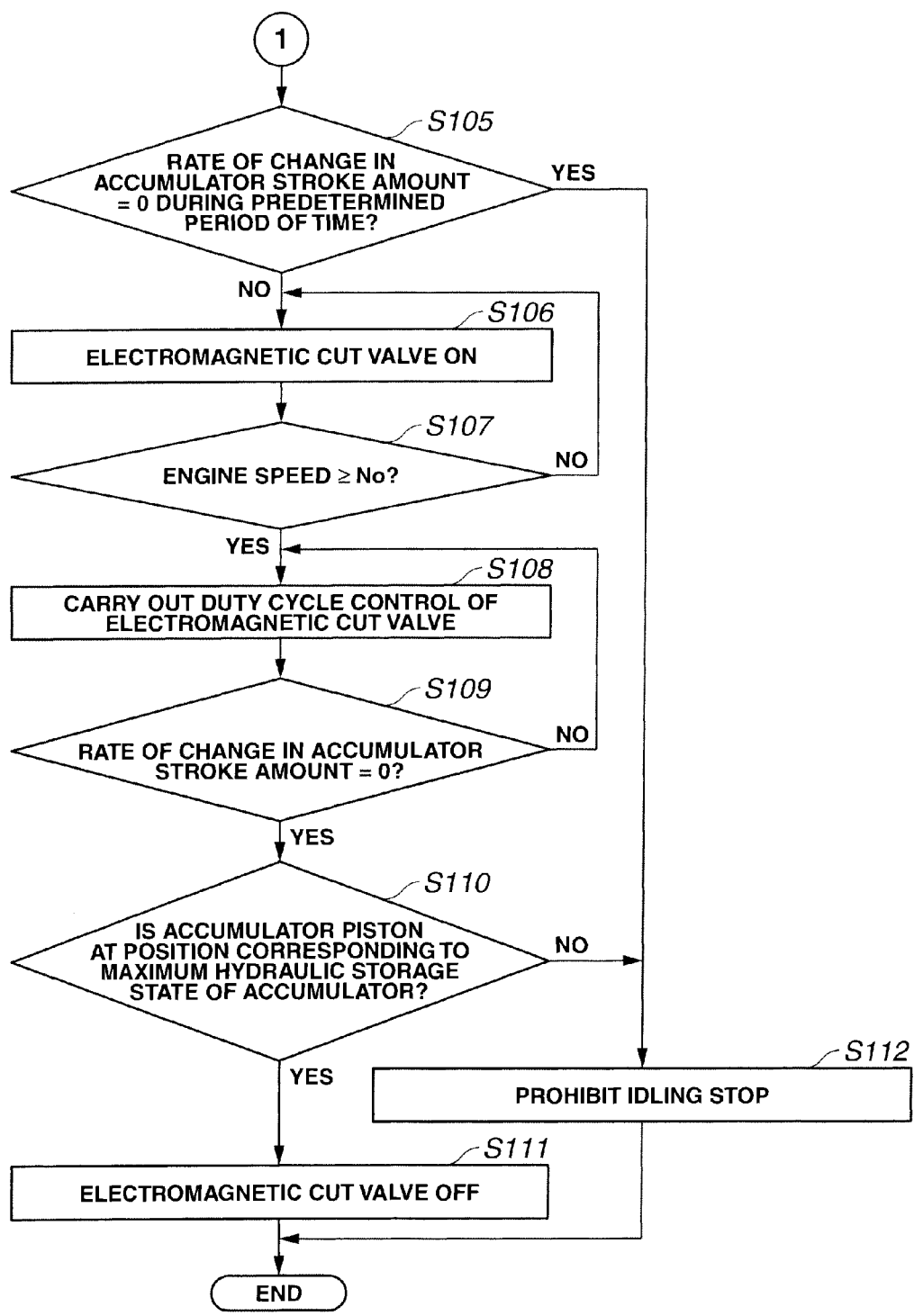
FIG. 5 is a flowchart showing a routine of the idling stop associating control which is executed in the hydraulic control apparatus according to the embodiment.
Figure 6:
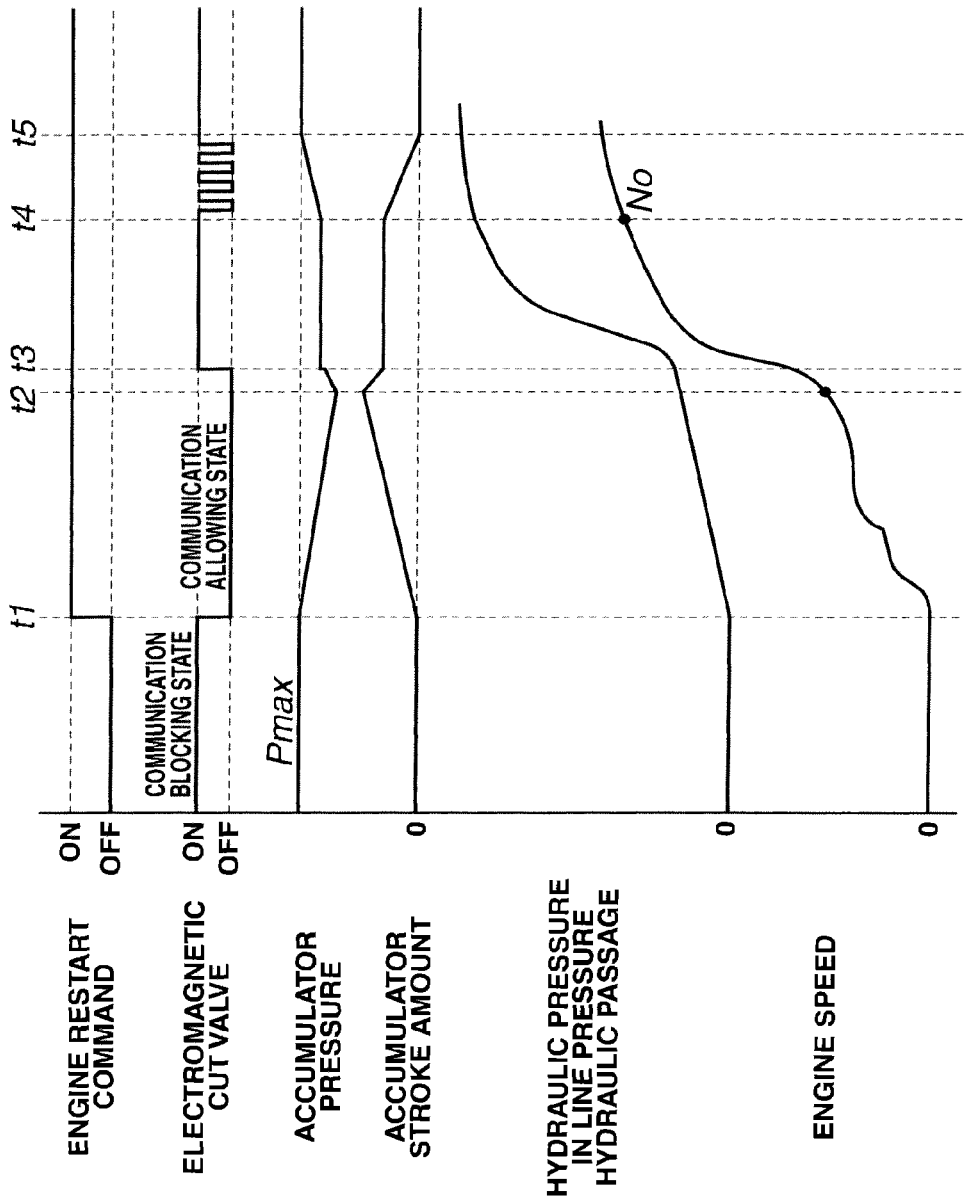
FIG. 6 is a time chart showing an operating process upon shifting from a stop state of an engine to restart of the engine.

The control of automatic transmission 2 which is conducted associating with idling stop (hereinafter referred to as idling stop associating control) is executed by ATCU 15 as follows. FIG. 4 and FIG. 5 are flow charts showing a routine of the idling stop associating control. FIG. 6 is a time chart showing an operating process upon shifting from a stop state of the engine to restart of the engine.

During the idling stop associating control, ATCU 15 monitors a change in the piston position and the accumulator stroke amount on the basis of the signal from stroke sensor 50.

As shown in FIG. 4, logic flow starts and goes to step S100 in which it is judged whether or not a command to stop engine 1 is outputted from vehicle electronic control unit 20.

When the answer in step S100 is YES, indicating that the command to stop engine 1 is outputted, the logic flow goes to step S101. In step S101, electromagnetic cut valve 34 is switched on so that the working oil as the accumulator pressure is stored in accumulator 40. The accumulator pressure at the time at which electromagnetic cut valve 34 is in the ON position is the maximum value Pmax corresponding to the line pressure.

In step S102, it is judged whether or not a command to restart engine 1 is outputted from vehicle electronic control unit 20.

When the answer in step S102 is NO, indicating that the command to restart engine 1 is not outputted, the logic flow goes back to step S101 in which electromagnetic cut valve 34 is held in the ON position.

When the answer in step S102 is YES, indicating that the command to restart engine 1 is outputted, the logic flow goes to step S103. The time at which the command to restart engine 1 is outputted is indicated at t1 as shown in FIG. 6. In response to the command to restart engine 1, ECU 10 starts a cranking operation so that engine speed begins to irregularly increase.

In step S103, ATCU 15 allows electromagnetic cut valve 34 to be in the OFF position such that the working oil is discharged from accumulator 40.

Owing to the discharge of the working oil, the accumulator pressure is reduced from the maximum value Pmax with the elapse of time from the time t1.

The logic flow proceeds to step S104 in which it is judged whether or not a rate of change in the accumulator stroke amount is a positive value in the discharge direction.

In a case where the rate of change in the accumulator stroke amount has a positive value, it is indicated that an output of oil pump 30 is low so that the line pressure is low. The hydraulic pressure in line pressure hydraulic passage 33 begins to increase by discharging the working oil from accumulator 40.

When the answer in step S104 is YES, the logic flow goes back to step S103 in which electromagnetic cut valve 34 is held in the OFF position.

During this time period, the cranking operation proceeds. As shown in FIG. 6, at time t2 at which engine 1 is completely combusted, oil pump 30 is capable of starting supply of a sufficient hydraulic pressure so that a relationship between the hydraulic pressure in line pressure hydraulic passage 33 and the accumulator pressure is changed over such that the former pressure is larger than the latter pressure. As a result, the rate of change in accumulator stroke amount is not a positive value (that is, 0).

When the answer in step S104 is NO, indicating that the rate of change in accumulator stroke amount is not a positive value, the logic flow proceeds to step S105. In step S105, it is judged whether or not the rate of change in accumulator stroke amount is kept at zero (0) during a predetermined time period.

If accumulator 40 is normally operated, the rate of change in accumulator stroke amount is changed to a negative value without staying at 0 by supplying accumulator 40 with the working oil through line pressure hydraulic passage 33. When the answer in step S105 is NO, the logic flow proceeds to step S106.

In step S106, electromagnetic cut valve 34 is switched to the ON position to block fluid communication between line pressure hydraulic passage 33 and accumulator 40.

As a result, as shown in FIG. 6, subsequent to time t3, the accumulator pressure is kept at a constant value, and the accumulator stroke amount is kept at 0 (i.e., the rate of change in accumulator stroke amount is 0). During this time period, engine 1 previously completely combusted is shifted to a stable state in which the engine speed is predetermined value No or more.

The logic flow proceeds to step S107 in which it is judged whether or not the engine speed is predetermined value No or more.

When the answer in step S107 is NO, indicating that the engine speed is less than predetermined value No, the logic flow goes back to step S106 in which electromagnetic cut valve 34 is held in the ON position. When the answer in step S107 is YES, indicating that the engine speed is predetermined value No or more at time t4 as shown in FIG. 6, the logic flow proceeds to step S108 in which electromagnetic cut valve 34 is subjected to duty-cycle control.

Electromagnetic cut valve 34 which is kept under duty-cycle control is repeatedly switched between the ON position and the OFF position to perform an orifice function so that accumulator 40 is slowly filled with the working oil from line pressure hydraulic passage 33. During filling accumulator 40 under the duty-cycle control of electromagnetic cut valve 34, the rate of change in accumulator stroke amount is kept negative.

The logic flow proceeds to step S109 in which it is judged whether or not the rate of change in accumulator stroke amount is 0.

When the answer in step S109 is NO, indicating that the rate of change in accumulator stroke amount is kept negative, the logic flow goes back to step S108.

When the answer in step S109 is YES, it is indicated that the rate of change in accumulator stroke amount has become 0 at time t5 as shown in FIG. 6 in which accumulator 40 is brought into the maximum hydraulic storage state having the maximum value Pmax of the accumulator pressure.

However, in a case where piston 45 of accumulator 40 is stuck in the stoke motion even when the accumulator pressure is less than the maximum value Pmax, the rate of change in accumulator stroke amount also becomes 0.

Therefore, when the answer in step S109 is YES, indicating that the rate of change in accumulator stroke amount is 0, the logic flow proceeds to step S110 in which it is judged whether or not piston 45 of accumulator 40 is seated on end wall 41b of cylinder 41. That is, in step S110, it is judged whether or not piston 45 is in a position corresponding to the maximum hydraulic storage state of accumulator 40.

When the answer in step S110 is YES, indicating that piston 45 is seated on end wall 41b of cylinder 41, the logic flow proceeds to step S111 in which electromagnetic cut valve 34 is switched to the OFF position whereby duty-cycle control thereof is terminated. The logic flow is then ended.

On the other hand, when the answer in step S105 is YES, indicating that the rate of change in accumulator stroke amount is kept at 0 during a predetermined time period, it is considered that a malfunction occurs in accumulator 40 and therefore piston 45 is stuck, and the logic flow proceeds to step S112. In step S112, a command to prohibit idling stop in the next execution of the routine is outputted to vehicle electronic control unit 20. The logic flow is then ended.

When the answer in step S110 is NO, indicating that piston 45 is not seated on end wall 41b of cylinder 41 (that is, piston 45 is not in the position corresponding to the maximum hydraulic storage state of accumulator 40), the logic flow also proceeds to step S112 and then is ended.

In addition to the above control, vehicle electronic control unit 20 can always monitor the position of piston 45 of accumulator 40 through stroke sensor 50, and can refrain from outputting the command to stop engine 1 in a case where piston 45 is not in the position corresponding to the maximum hydraulic storage state of accumulator 40 under a condition that the automatic stop condition of engine 1 is fulfilled.

As a result, in a case where accumulator 40 is in such an abnormal state that piston 45 is stuck, it is possible to avoid idling stop.

As described above, in the hydraulic pressure control apparatus according to the embodiment, the hydraulic pressure is discharged from accumulator 40 (i.e., hydraulic storage device) to line pressure hydraulic passage 33 to compensate a lack of a hydraulic pressure from oil pump 30 upon restarting engine 1 from idling stop. The hydraulic control apparatus includes stroke sensor 50 (i.e., stroke amount detecting member) which detects an amount of a stroke of piston 45 in accumulator 40. After electromagnetic cut valve 34 (i.e., cut valve) is opened upon restarting engine 1, electromagnetic cut valve 34 is closed in a case where a change in the amount of a stroke of piston 45 detected by stroke sensor 50 is reversed from such a direction as to discharge the hydraulic pressure from accumulator 40 to such a direction as to supply the hydraulic pressure to accumulator 40.

With this construction, during the time period in which the hydraulic pressure from the oil pump is increased, the hydraulic pressure is not supplied to accumulator 40 so that the hydraulic pressure from the oil pump can be supplied to hydraulic circuit 33 exclusively so as to fulfill hydraulic circuit 33 and increase the hydraulic pressure in hydraulic circuit 33. As a result, it is possible to facilitate a stroke reducing operation of frictional engagement devices, for instance, low clutch 39 and obtain a high response ability.

Further, electromagnetic cut valve 34 is subjected to duty-cycle control until piston 45 is located to a position corresponding to the maximum hydraulic storage state of accumulator 40 in a case where engine speed becomes the predetermined value No or more after electromagnetic cut valve 34 is closed. With this construction, accumulator 40 can be slowly supplied with the hydraulic pressure from line pressure hydraulic passage 33 to thereby cause abnormal feeling, and can be kept in the maximum hydraulic storage state to prepare for the next idling stop.

Further, in a case where after cut valve 34 is opened, a rate of change in the stroke amount of piston 45 is kept at 0 during a predetermined time period when piston 45 is in a position except for both ends of the stroke region of piston 45, it is determined that piston 45 is erroneously stopped during the operation of discharging the hydraulic pressure due to a malfunction of sticking of piston 45, whereby idling stop is prohibited. As a result, it is possible to avoid idling stop with a low restart response ability.

Stroke sensor 50 includes casing 51 which is fixed to end wall 41b (i.e., second end wall) opposite to base wall 41a (i.e., first end wall) of cylinder 41, slide shaft 53 which extends through casing 41 in an axial direction of casing 41 and is displaceable together with piston 45. Resistor member 55 is provided on slide shaft 53 along an axial direction of slide shaft 53. Brush 57 is attached to casing 41 and slidable on resistor member 55. Resistor member 55 and brush 57 cooperate with each other to constitute a potentiometer. With this construction, it is possible to readily monitor the position of piston 45 and detect the displacement amount of piston 45 on the basis of an output of the potentiometer.

Further, stroke sensor 50 is disposed on an inner radial side of return spring 47. With this construction, it is not necessary to increase a dimension of accumulator 40.

Further, stroke sensor 50 includes back spring 58 which biases slide shaft 53 toward the side of base wall 41a of cylinder 41 to thereby allow one end (i.e., head 54) of slide shaft 53 to always abut against bottom wall 45a of piston 45. With this construction, slide shaft 53 can be displaced together with piston 45. It is not necessary to subject piston 45 to additional machining, and therefore, stroke sensor 50 can be readily applied to a conventional accumulator.

Figure 7:
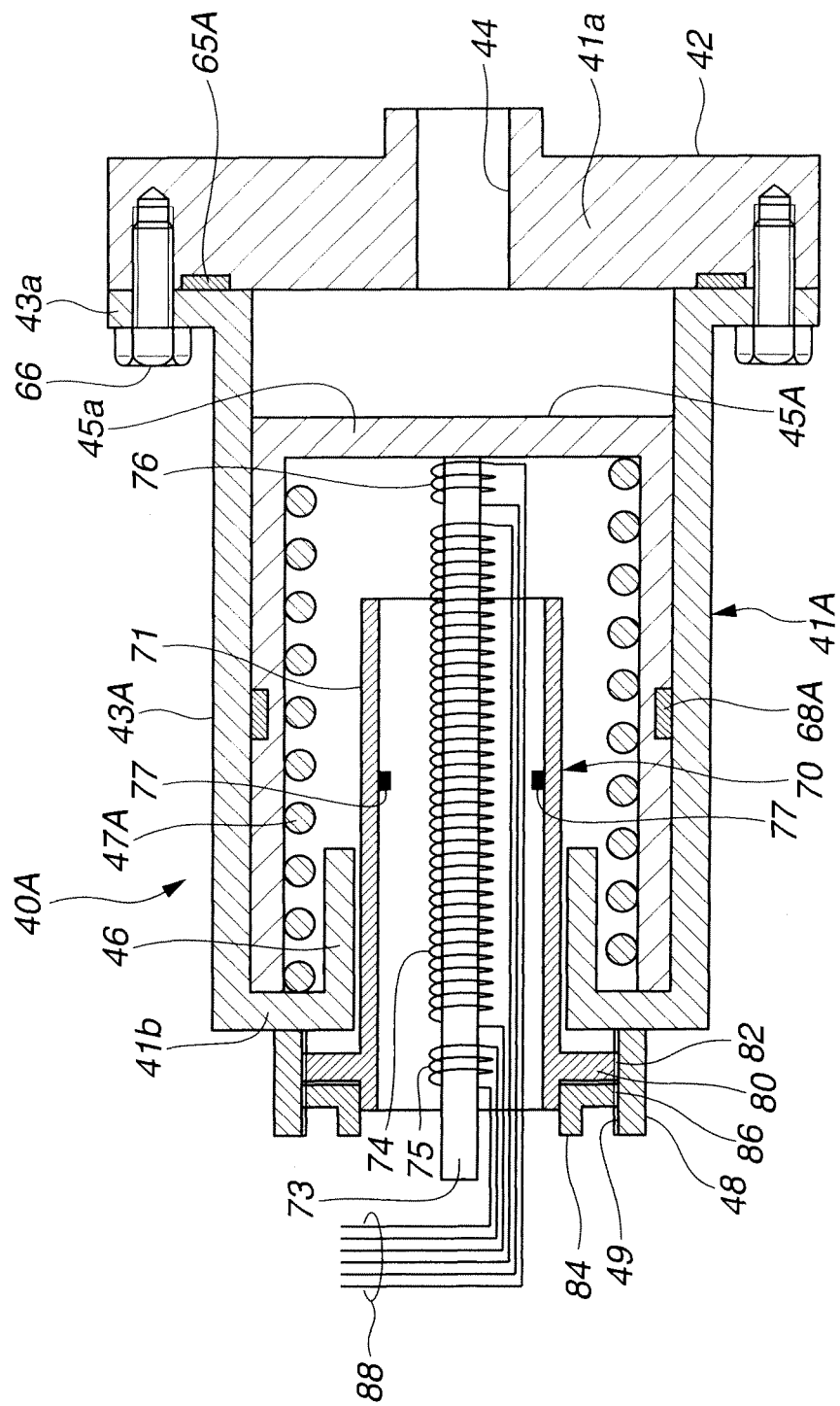
FIG. 7 is a diagram showing an accumulator according to a modification of the embodiment.
Figure 8:
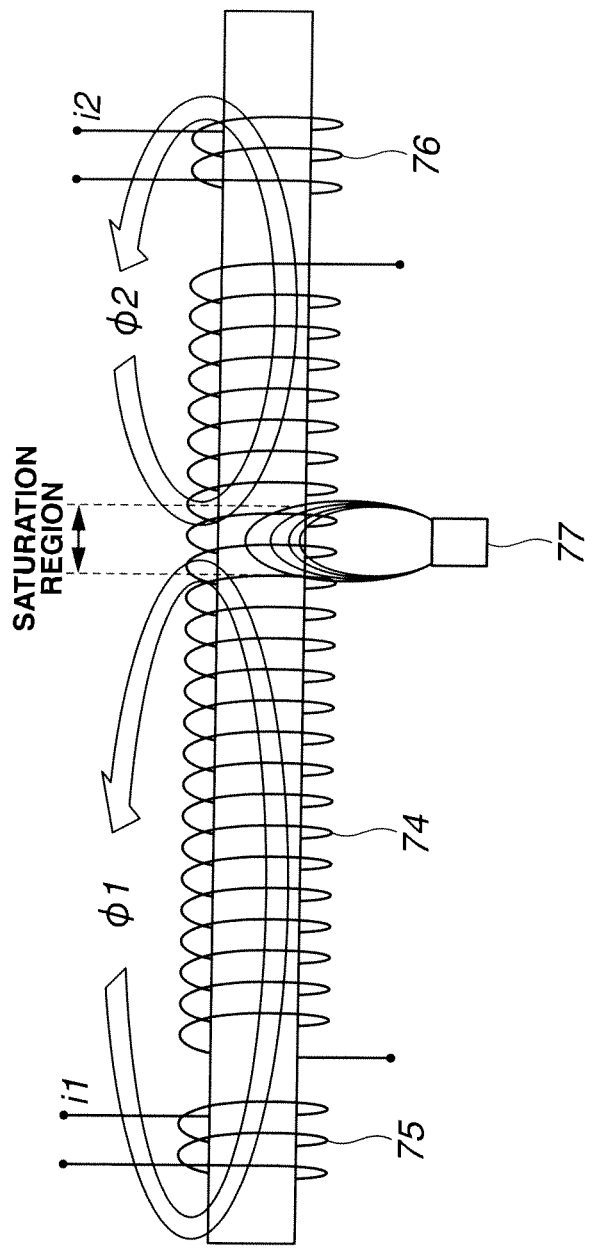
FIG. 8 is an explanatory diagram showing the principle of operation of a stroke sensor according to the modification of the embodiment.

Referring to FIG. 7 and FIG. 8, a modification of the embodiment will be explained hereinafter. The modification differs from the embodiment in that an accumulator includes a contactless permanent magnet linear displacement sensor as a stroke sensor instead of the resistance-contact potentiometer used in the embodiment.

FIG. 7 is a diagram showing a construction of the accumulator according to the modification of the embodiment. As shown in FIG. 7, accumulator 40A according to the modification includes stroke sensor 70 which is in the form of a contactless permanent magnet linear displacement sensor. Similar to the embodiment, accumulator 40A is connected to line pressure hydraulic passage 33 through electromagnetic cut valve 34.

Accumulator 40A includes cylinder 41A which is constituted of base plate 42 and tubular housing 43A. Tubular housing 43A has flange portion 43a at one end thereof which extends in a radially outward direction of tubular housing 43A. Tubular housing 43A is fixed to base plate 42 at flange portion 43a by means of bolts 66. Oil seal 65 is interposed between an end surface of flange portion 43a and an end surface of base plate 42 which are opposed to each other, and serves for hermetically sealing between flange portion 43a and base plate 42.

Base plate 42 is formed with oil hole 44 which is communicated with electromagnetic cut valve 34. Base plate 42 serves as base wall 41a of cylinder 41A which is located on the side of one end of cylinder 41A. A bottom of tubular housing 43A serves as end wall 41b of cylinder 41A which is located on the side of the other end of cylinder 41A.

End wall 41b of cylinder 41A has a through-hole in a central part thereof through which a central axis of cylinder 41A extends. Inner sleeve 46 extends from a peripheral edge of the through-hole of end wall 41b toward an inside of cylinder 41A.

Accommodated in cylinder 41A is piston 45A which has a hollow cylindrical shape. Piston 45A includes bottom wall 45a disposed on the side of base plate 42 and an open end disposed on an opposite side of bottom wall 45a. Seal ring 68A is disposed on an outer circumferential surface of piston 45A.

Return spring 47A is accommodated inside of piston 45A and disposed between bottom wall 45a of piston 45A and end wall 41b of cylinder 41A. Return spring 47A is disposed on an outer radial side of inner sleeve 46.

Fixing sleeve portion 48 outwardly extends from end wall 41b of cylinder 41A in the axial direction of cylinder 41A. Fixing sleeve portion 48 has an outer diameter smaller than that of tubular housing 43A and an inner diameter larger than that of inner sleeve 46. Fixing sleeve portion 48 is arranged coaxially with tubular housing 43A and inner sleeve 46. Formed on an inner circumferential surface of fixing sleeve portion 48 is internal thread portion 49 serving as a sensor mounting portion to which stroke sensor 70 is mounted.

Stroke sensor 70 includes hollow cylindrical casing 71, slide shaft 73 with coils 74, 75, 76 which extends through casing 71, and magnet 77 fixedly disposed on an inner surface of casing 71. First output coil 75, second output coil 76 and input coil 74 are wound on an outer circumferential surface of slide shaft 73 and spaced apart from each other in an axial direction of slide shaft 73. First output coil 75, second output coil 76 and input coil 74 disposed between first output coil 75 and second output coil 76 are of the same specification type.

Two magnets 77 are disposed in a diametrically opposed relation to each other, i.e., on a line aligned with a diameter of casing 71 in such a direction that a magnetic flux of magnets 77 extends across input coil 74.

Casing 71 has an outer diameter substantially the same as an inner diameter of inner sleeve 46. Casing 71 extends into cylinder 41A through the through-hole of end wall 41b and is surrounded by inner sleeve 46. Casing 71 has flange 80 at one axial end portion thereof and external thread portion 86 on an outer circumferential surface of flange 80. External thread portion 82 is engaged with internal thread portion 49 of fixing sleeve portion 48 by screwing flange 80 into fixing sleeve portion 48. Casing 71 is rotatable about an axis thereof to thereby move along pitches of threads of internal thread portion 49 in an axial direction thereof. Inserted and screwed into fixing sleeve portion 48 is lock bolt 84. Lock bolt 84 has external thread portion 86 on an outer circumferential surface thereof which is engaged with internal thread portion 49 of fixing sleeve portion 48.

Slide shaft 73 has one end fixed to bottom wall 45a of piston 45A and is movable together with piston 45A within casing 71 in an axial direction thereof.

Magnets 77 are arranged in such an axial position that the magnetic flux always extends across input coil 74 wound on slide shaft 73 even when piston 45A is in any axial position within a range of the stroke.

Wirings 88 which extend from coils 74 to 76 and are drawn out from an outside open end of casing 71. A signal outputted from stroke sensor 70 is inputted to ATCU 15 through wirings 88.

The principle of operation of stroke sensor 70 is explained hereinafter. Specifically, when input coil 74 is merely energized to generate a magnetic flux φ by flowing current through input coil 74, a predetermined current corresponding to the magnetic flux φ is generated in first and second output coils 75, 76 which are disposed adjacent to both ends of input coil 74. Since first and second output coils 75, 76 adjacent to both ends of input coil 74 are of the same specification type, the same amount of current is allowed to flow through first and second output coils 75, 76.

As shown in FIG. 8, in a case where under the above condition, the magnetic flux of magnets 77 extends across a midportion of input coil 74, a saturation region of the magnetic flux is generated in the portion of input coil 74. The magnetic flux φ generated in input coil 74 is divided into magnetic flux φ1 and magnetic flux φ2 which are located on both sides of the saturation region. As a result, the current which flows in first output coil 75 and second output coil 76 is divided into current i1 and current i2 which correspond to magnetic flux φ1 and magnetic flux φ2, respectively.

When the position of piston 45A is changed, slide shaft 73 is moved together with piston 45A and input coil 74 wound on slide shaft 73. Therefore, the position of magnets 77 fixed to casing 71 with respect to input coil 74 is changed so that output current i1 of first output coil 75 and output current i2 of second output coil 76 are varied. Accordingly, the position of piston 45A, i.e., the accumulator stroke amount can be detected on the basis of comparison between current i1 and current i2.

FIG. 7 shows that the open end of piston 45A is allowed to seat on end wall 41b of cylinder 41A by return spring 47A which is compressed by a maximum amount with a maximum value of the accumulator pressure. When piston 45A is in this position, magnets 77, i.e., casing 71, are set in such a position relative to tubular housing 43A of cylinder 41A that currents i1, i2 become equal to each other, by rotating casing 71. Subsequently, lock bolt 84 is screwed into fixing sleeve portion 48 until lock bolt 84 abuts against flange 80, and then tightened. Thus, casing 71 is fixed and held in the position relative to housing 43A by a so-called double-nut effect which can be accomplished by flange 80 and lock bolt 84.

Further, fixing sleeve portion 48 can be covered with a dust-proof cover (not shown) in the manner similar to dust-proof cover 59 of the above embodiment.

As described above, in the hydraulic pressure control apparatus according to this modification, accumulator 40A (i.e., hydraulic storage device) includes piston 45A which is biased toward base wall 41a (i.e., first end wall) of cylinder 41A which is opened toward the side of line pressure hydraulic passage 33, by return spring 47A. Further, accumulator 40A includes stroke sensor 70 (i.e., stroke amount detecting member) which is disposed on end wall 41b (i.e., second end wall) of cylinder 41A which is located on an opposite side of base wall 41a.

Further, stroke sensor 70 includes casing 71 fixed to the side of end wall 41b of cylinder 41A, and slide shaft 73 which extends through casing 71 in the axial direction of casing 71 and is displaceable together with piston 45A. Input coil 74 and first and second output coils 75, 76 are provided on slide shaft 73 along the axial direction of slide shaft 73. Magnets 77 are mounted to casing 71 such that a magnetic flux of magnets 77 extends across input coil 74. Input coil 74 and first and second output coils 75, 76 cooperate with magnets 77 to constitute a permanent magnet linear displacement sensor. With this construction of stroke sensor 70, it is possible to readily monitor a position of piston 45A and detect an amount of displacement of piston 45A on the basis of an output of stroke sensor 70.

Particularly, a permanent magnet linear displacement sensor used as stroke sensor 70 is of a contactless type. Therefore, stroke sensor 70 can be free from deterioration in durability due to abrasion and decrease in accuracy due to a dust, etc.

Further, stroke sensor 70 is disposed on the inner radial side of return spring 47A. With this arrangement, stroke sensor 70 can be accommodated within cylinder 41A in coaxial relation to return spring 47A so that accumulator 40A can be prevented from being upsized.

Further, fixing sleeve portion 48 (i.e., sleeve portion) outwardly extends from end wall 41b of cylinder 41A in the axial direction of cylinder 41A, and internal thread portion 49 is formed on the inner circumferential surface of fixing sleeve portion 48. Casing 71 includes flange 80 which has external thread portion 82 engageable with internal thread portion 49 of fixing sleeve portion 48, on the outer circumferential surface thereof. The axial position of casing 71 can be adjusted by rotating casing 71 about an axis thereof in fixing sleeve portion 48. Casing 71 can be fixed to fixing sleeve portion 48 by means of lock bolt 84 which has external thread portion 86 on the outer circumferential surface thereof and is engageable with internal thread portion 49 of fixing sleeve portion 48. By abutting lock bolt 84 against flange 80 and tightening lock bolt 84, casing 71 can be fixed to fixing sleeve portion 48. Accordingly, it is possible to readily calibrate an output of stroke sensor 70 and ensure positioning and fixing of stroke sensor 70.

Meanwhile, in accumulator 40 according to the embodiment, casing 51 of stroke sensor 50 is merely fixed to end wall 41b of cylinder 41. However, similarly to accumulator 40A according to the modification, accumulator 40 can be provided with a fixing sleeve portion which outwardly extends from end wall 41b of cylinder 41 in the axial direction of cylinder 41, and an internal thread portion formed on an inner circumferential surface of the fixing sleeve portion. Casing 51 can be provided with a flange which has an external thread portion engageable with the internal thread portion of the fixing sleeve portion on the outer circumferential surface of the flange. The axial position of casing 51 can be adjusted by rotating casing 51 about the axis thereof in the fixing sleeve portion, and casing 51 can be fixed in the thus adjusted axial position by means of a lock bolt.

On the other hand, in accumulator 40A according to the modification, slide shaft 73 of stroke sensor 70 is fixed to bottom wall 45a of piston 45A. However, similarly to accumulator 40 of the embodiment, casing 71 of stroke sensor 70 can be provided with an inside end wall, and slide shaft 73 can be provided with a head. Further, a back spring can be disposed between the inside end wall and the head. With this construction, the head of slide shaft 73 can be allowed to always abut against bottom wall 45a of piston 45 to thereby displace slide shaft 73 together with piston 45A. With this construction, it is not required to subject piston 45A to further machining.

This application is based on a prior Japanese Patent Application No. 2010-100890 filed on Apr. 26, 2010. The entire contents of the Japanese Patent Application No. 2010-100890 is hereby incorporated by reference.

Although the present invention has been described above by reference to a certain embodiment of the present invention and the modification, the present invention is not limited to the embodiment and the modification as described above. Variations of the embodiment and the modification as described above will occur to those skilled in the art in light of the above teachings. The scope of the present invention is defined with reference to the following claims.

What is claimed is:

1. A hydraulic control apparatus for a vehicle equipped with an automatic transmission, the vehicle having a function of idling stop of an engine, the automatic transmission including a hydraulic circuit connected to an oil pump which is driven by the engine, the hydraulic control apparatus comprising:
   a cut valve disposed in the hydraulic circuit;
   a hydraulic storage device comprising a piston, the hydraulic storage device being connected to the hydraulic circuit through the cut valve;
   a stroke amount detecting means for detecting an amount of a stroke of the piston in the hydraulic storage device; and
   a control means for discharging a hydraulic pressure from the hydraulic storage device to the hydraulic circuit so as to compensate a lack of a hydraulic pressure from the oil pump upon restarting the engine from the idling stop,
   wherein the control means is configured to open the cut valve upon restarting the engine and, after opening the cut valve, close the cut valve in a case where a change in the detected amount of a stroke of the piston is reversed from such a direction as to discharge the hydraulic pressure from the hydraulic storage device to such a direction as to supply the hydraulic pressure to the hydraulic storage device.

2. The hydraulic control apparatus as claimed in claim 1, wherein the control means is configured to subject the cut valve to duty-cycle control until the piston is located to a position corresponding to a maximum hydraulic storage state of the hydraulic storage device in a case where an engine speed becomes a predetermined value or more after the cut valve is closed.

3. The hydraulic control apparatus as claimed in claim 1, wherein the control means is configured to prohibit the idling stop in a case where after the cut valve is opened, a rate of change in the amount of stroke of the piston is kept at 0 during a predetermined time period when the piston is in a position except for both ends of a stroke region of the piston.

4. The hydraulic control apparatus as claimed in claim 1, wherein the hydraulic storage device is an accumulator which includes the piston, a cylinder which accommodates the piston and includes a first end wall opened to a side of the hydraulic circuit, and a return spring which biases the piston toward a side of the first end wall.

5. The hydraulic control apparatus as claimed in claim 4, wherein the stroke amount detecting means includes a casing which is fixed to a second end wall opposite to the first end wall of the cylinder, a slide shaft which extends through the casing in an axial direction of the casing and is displaceable together with the piston, a resistor member provided on the slide shaft along an axial direction of the slide shaft, and a brush which is attached to the casing and slidable on the resistor member, the resistor member and the brush cooperating with each other to constitute a potentiometer.

6. The hydraulic control apparatus as claimed in claim 4, wherein the stroke amount detecting means includes a casing which is fixed to a side of a second end wall opposite to the first end wall of the cylinder, a slide shaft which extends through the casing in an axial direction of the casing and is displaceable together with the piston, an input coil and output coils provided on the slide shaft along an axial direction of the slide shaft, and magnets which is attached to the casing such that a magnetic flux of the magnets extends across the input coil, the input coil and the output coils cooperating with the magnets to constitute a permanent magnet linear displacement sensor.

7. The hydraulic control apparatus as claimed in claim 5, wherein the stroke amount detecting means includes a back spring which biases the slide shaft toward the side of the first end wall to thereby allow one end of the slide shaft to always abut against the piston.

8. The hydraulic control apparatus as claimed in claim 5, wherein the stroke amount detecting means is disposed on an inner radial side of the return spring.

9. The hydraulic control apparatus as claimed in claim 5, wherein the cylinder includes a sleeve portion extending outwardly from the second end wall, the sleeve portion being formed with an internal thread portion on an inner circumferential surface thereof,
   the casing includes a flange which has an external thread portion on an outer circumferential surface thereof and is engaged with the internal thread portion of the sleeve portion, an axial position of the casing being adjustable by rotating the casing about an axis of the casing,
   the hydraulic control apparatus further comprising a lock bolt which has an external thread portion on an outer circumferential surface thereof which is engaged with the internal thread portion of the sleeve portion, the lock bolt being abutted against the flange of the casing and tightened to fix the casing to the sleeve portion of the cylinder.

* * * * *